(12) United States Patent
de Jong et al.

(10) Patent No.: US 9,614,970 B1
(45) Date of Patent: Apr. 4, 2017

(54) TELEPHONE CONFERENCING APPARATUS

(71) Applicants: Ingolf J. C. de Jong, Draper, UT (US); Brandon R. Gramse, Draper, UT (US)

(72) Inventors: Ingolf J. C. de Jong, Draper, UT (US); Brandon R. Gramse, Draper, UT (US)

( * ) Notice: Subject to any disclaimer, the term of this patent is extended or adjusted under 35 U.S.C. 154(b) by 34 days.

(21) Appl. No.: 14/708,011

(22) Filed: May 8, 2015

Related U.S. Application Data

(60) Provisional application No. 61/990,574, filed on May 8, 2014.

(51) Int. Cl.
 H04M 9/08 (2006.01)
 H04M 3/56 (2006.01)
 H04W 4/00 (2009.01)
 H04M 1/725 (2006.01)
 H04W 88/04 (2009.01)

(52) U.S. Cl.
 CPC ......... H04M 3/568 (2013.01); H04M 1/7253 (2013.01); H04W 4/008 (2013.01); H04W 88/04 (2013.01)

(58) Field of Classification Search
 CPC ........ H04N 7/15; H04N 7/152; H04L 65/403; H04M 3/56; H04M 3/568; H04M 9/082
 USPC ............ 379/406.06, 406.07, 406.05, 406.02
 See application file for complete search history.

(56) References Cited

U.S. PATENT DOCUMENTS

| | | | |
|---|---|---|---|
| 2007/0042762 A1* | 2/2007 | Guccione | H04M 3/568 455/416 |
| 2011/0099485 A1* | 4/2011 | Alcorn | H04R 27/00 715/753 |
| 2013/0034248 A1* | 2/2013 | Mizobuchi | H04R 3/00 381/120 |
| 2014/0064519 A1* | 3/2014 | Silfvast | H04H 60/04 381/119 |

* cited by examiner

*Primary Examiner* — Alexander Jamal
(74) *Attorney, Agent, or Firm* — Legends Law Group, PLLC; Stephen H. Bean, Esq.

(57) ABSTRACT

A telephone conferencing apparatus is disclosed. The apparatus utilizes Bluetooth or similar wireless data exchange technology to connect a mobile telephone to an audio conferencing system. The device transmits processed audio from local input sources over the Bluetooth-enabled mobile telephone utilizing the mobile phone network of the user's choice. Audio signals received into the device from mobile telephones are sent to the far end during a telephone conference call, and audio signals from the far-end on a mobile or wireless telephone call will route to the audio output on the local device.

20 Claims, 6 Drawing Sheets

TELEPHONE CONFERENCING APPARATUS

FIELD OF THE INVENTION

The present invention provides an interface to allow multiple participants in a room to participate in a two-way telephone conference call utilizing a Bluetooth-enabled mobile phone over a standard mobile network.

BACKGROUND OF THE INVENTION

Various methods are currently used for providing audio conferencing to multiple participants. These methods include providing multiple wired or wireless microphones so that each participant in a room can be heard by the far end during an audio conference call. Audio from these multiple wired and wireless microphones are mixed and processed in a digital signal processor. The prior art teaches various acoustic echo cancellation methods to prevent audio originating from participants at the far end from returning back to the far end in what is known as an echo. This echo cancellation processing is accomplished in a digital signal processing device.

For telephone audio conferencing, an analog telephone land line or Voice-over-IP phone line must be connected into the digital signal processing device. This allows audio to be transmitted over the land line or Voice-over-IP line to the far end participants, and allows audio from the far end participants to be received by participants in the local room. The audio signal is routed in the digital signal processing device to send mixed microphone audio to the far end, and to send the received audio from the far end to the local room loudspeakers for participants to hear.

The present invention eliminates the need to use a land line or Voice-over-IP line in a conferencing system utilizing signal processing technology and instead utilizes standard mobile phones while still offering echo cancellation technology. Current mobile telephones have provisions for connecting to devices utilizing Bluetooth technology. To utilize Bluetooth, users must pair their devices with a Bluetooth enabled device to allow for wireless audio communication between the two devices. The present invention provides an interface between a standard Bluetooth-enabled mobile phone to transmit processed audio signal from multiple wired or wireless microphones in a local room to far end participants.

There exists a need for a telephone conferencing device that eliminates the requirement of a land line or a Voice-over-IP line for acceptable echo cancellation signal processing. There further exists a need for a telephone conferencing device that utilizes the Bluetooth feature of mobile telephones to capture audio signals from one or more mobile telephones and process those signals into an enhanced digital audio stream for delivery to far end users. There exists an additional need for a device that processes digital audio signals from mobile telephones and delivers echo cancellation and enhanced audio features to all call participants in the context of telephone conferencing with land or Voice-over-IP telephone lines.

SUMMARY OF THE INVENTION

The present invention utilizes Bluetooth technology to connect a Bluetooth-enabled mobile telephone to a larger audio conferencing system. The device acts as an interface to transmit mixed audio from multiple wired and/or wireless microphones connected into an external microphone mixer over the Bluetooth-enabled mobile telephone utilizing the mobile phone network of the user's choice. The device also acts as an interface to amplify audio received from the far-end during a call utilizing an external power amplifier. Audio signals received into the device from mobile telephones are sent to the far end during a telephone conference call, and audio signals from the far-end on a mobile or wireless telephone call will route to the audio output on the local device.

DETAILED DESCRIPTION OF THE INVENTION

The present invention provides an interface to allow multiple participants in a local room to participate in a two-way communication conference call utilizing any standard mobile network.

Figure 1:
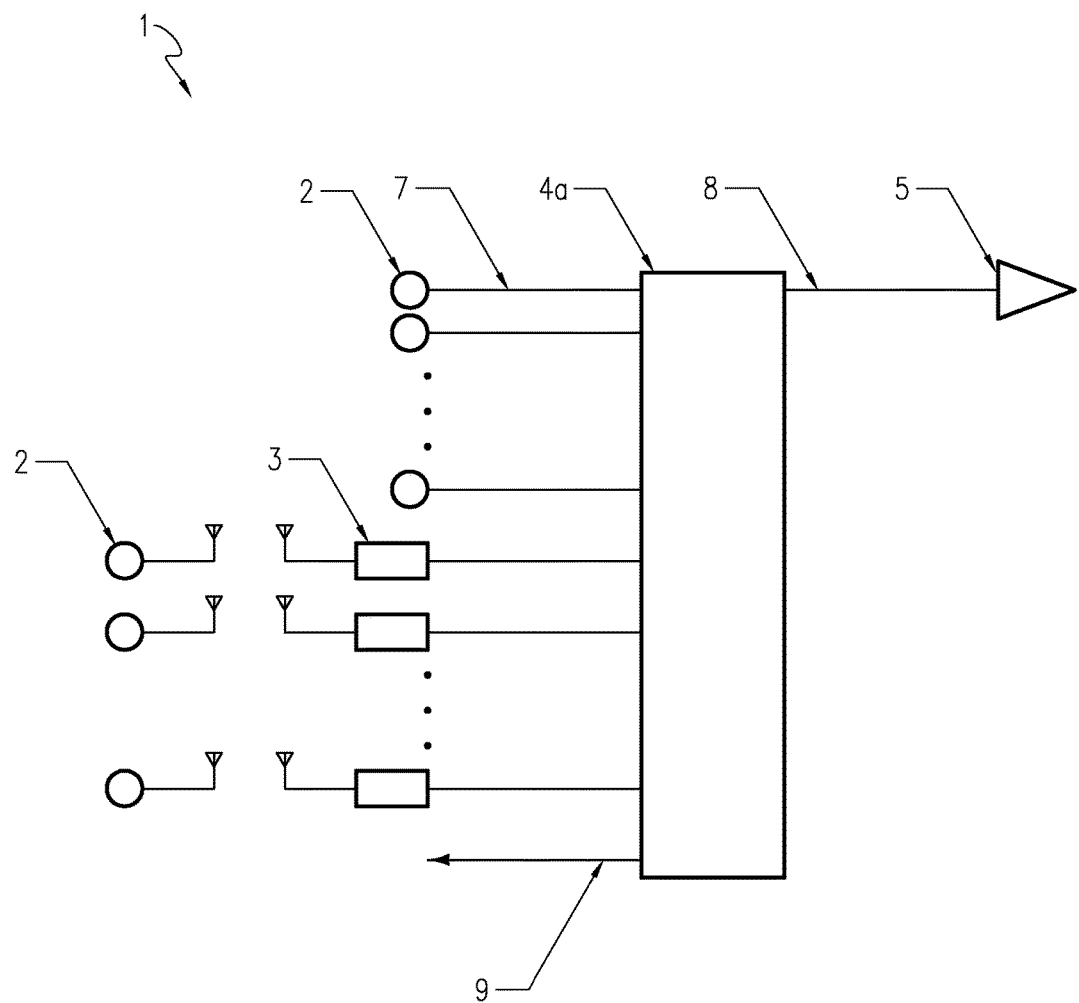
FIG. 1 illustrates a block diagram of a known digital signal processing device for connecting multiple wired and/or wireless microphones to enable multiple participants in the same room to connect into an audio teleconference call.
Figure 2:
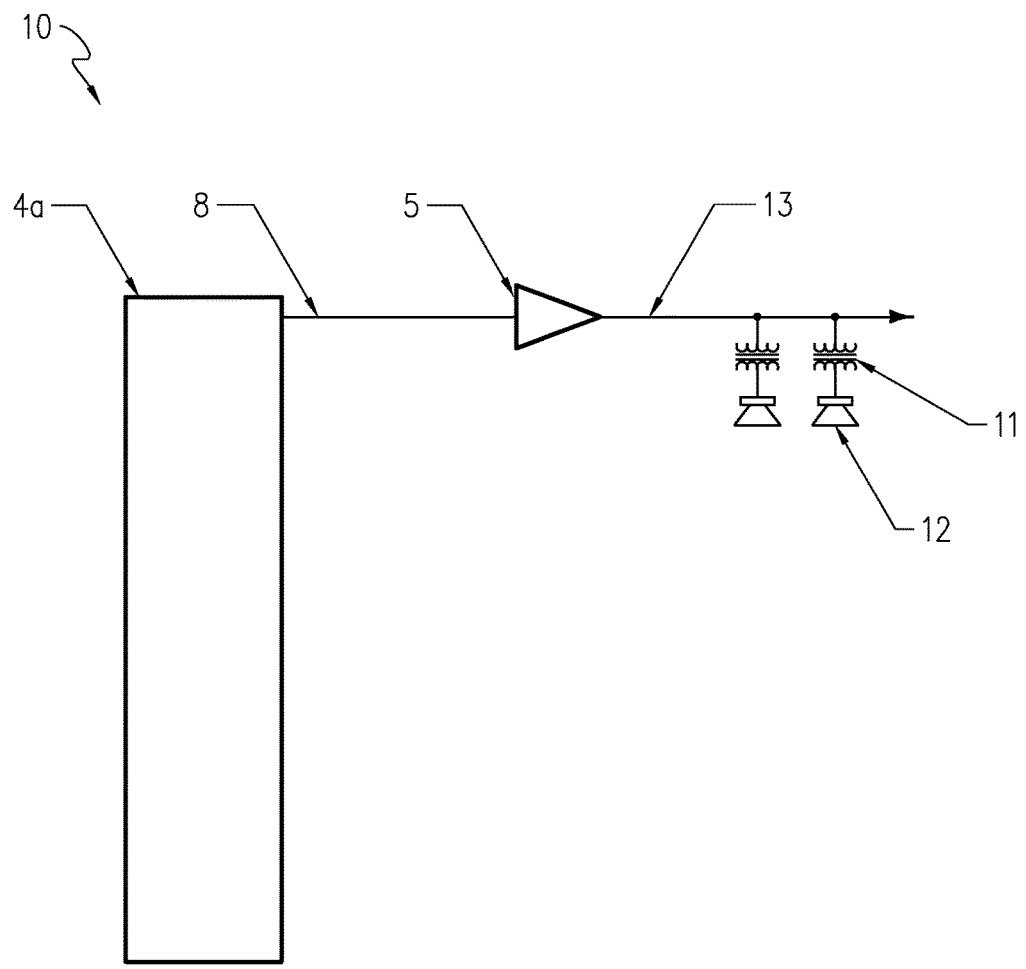
FIG. 2 illustrates a block diagram of a known digital signal processing device for providing a signal to a power amplifier for amplifying mixed audio to multiple external loudspeakers located in a room.

FIG. 1 and FIG. 2 illustrate the known traditional methods for configuring a two-way audio conference call. Multiple wired 2 and wireless 3 microphones are connected with balanced or unbalanced mic-level or line-level audio 7 into a digital signal processing device 4a. An analog or Voice-over-IP telephone line 9 is also connected into the digital signal processing device 4a to provide for two-way audio conferencing from the connected wired 2 and wireless 3 microphones over land line or VoIP line 9. All wired 2 and wireless 3 microphones provided in the room are mixed and processed with acoustic echo cancellation in the digital signal processing device 4a, whereupon all mixed and processed signals are sent over line level audio 8 to the appropriate power amplifier 5. The signal is then amplified and the amplified speaker-level signal 13 is sent to all installed room loudspeakers 12, traditionally utilizing a 70V method for daisy-chaining loudspeakers using transformers 11.

Figure 3:
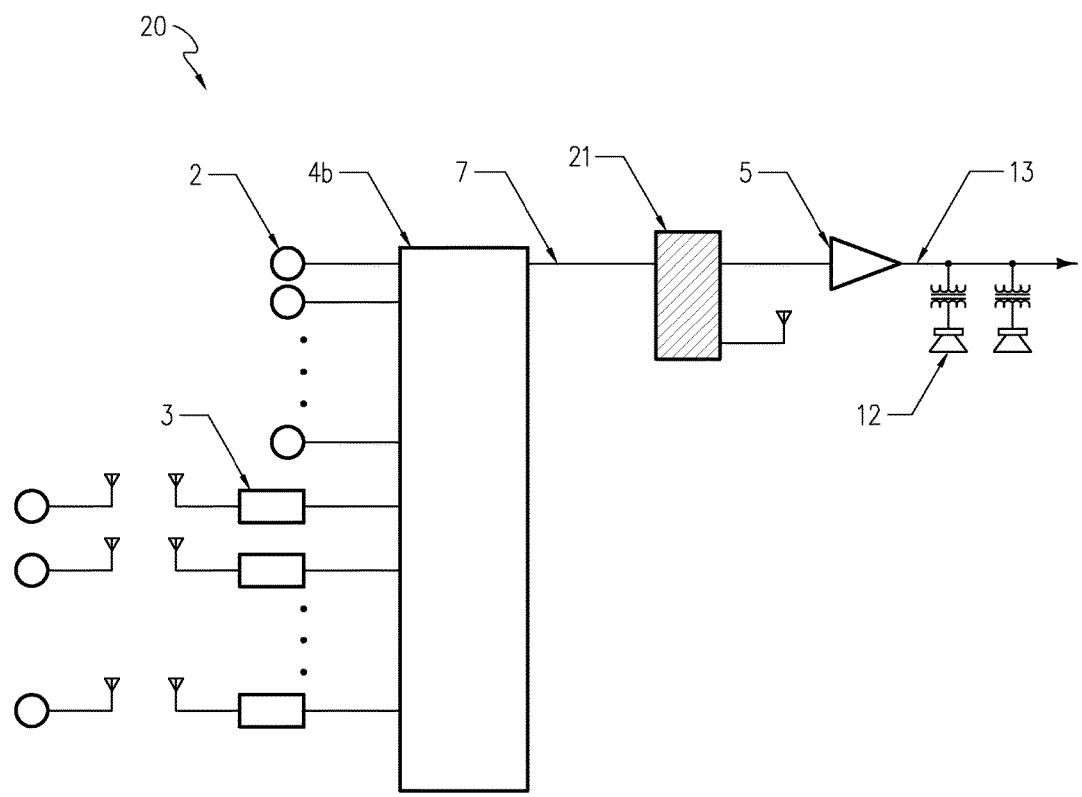
FIG. 3 illustrates a block diagram of the Bluetooth interface invention connected between a known microphone mixing device or digital signal processor and a known power amplifier.

The present invention allows users to eliminate the need for a digital signal processing device 4a and instead can utilize a basic microphone mixing device 4b. This also eliminates the need for an analog or Voice-over-IP land line 9. According to the present invention, FIG. 3 illustrates the basic microphone mixing device 4b without the land line connected, and the wireless audio feed processor 21 inserted between the basic microphone mixing device 4b and power amplifier 5. It should be noted that wireless audio feed processor 21 can also be used with the known digital signal processing device 4a.

Figure 4:
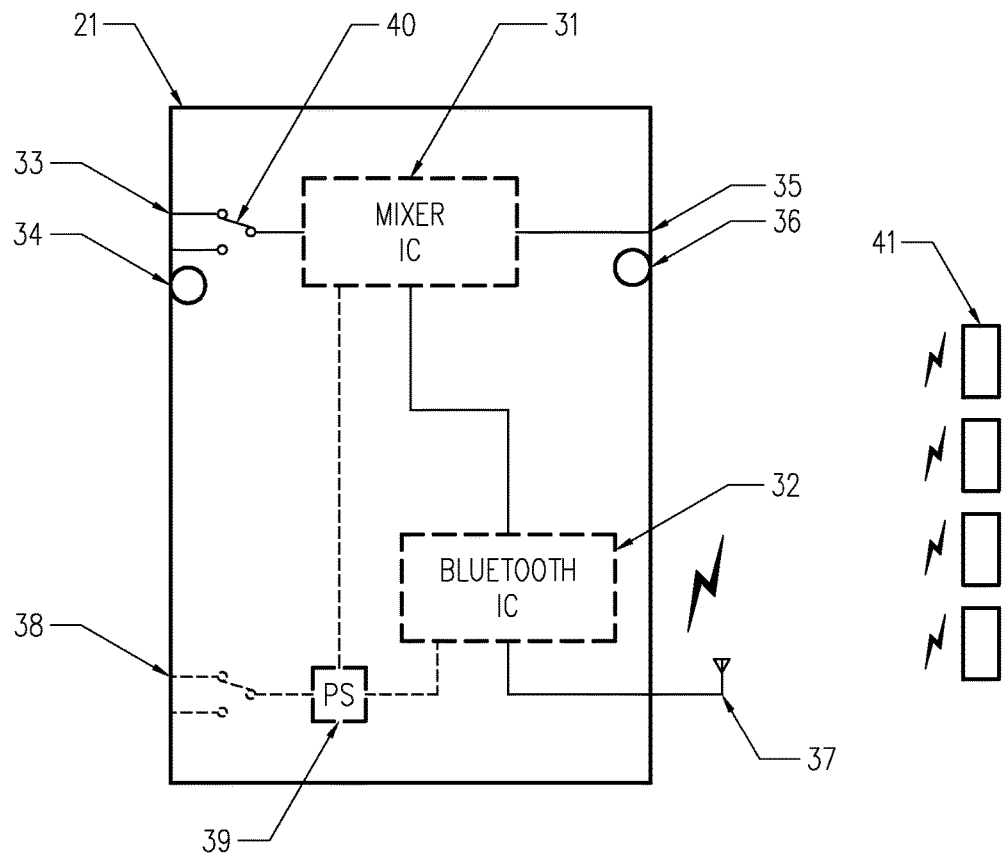
FIG. 4 illustrates a block diagram of the Bluetooth interface invention.

FIG. 4 illustrates the block diagram of wireless audio feed processor 21 of the present invention. Wireless audio feed processor 21 receives a balanced or unbalanced line-level or microphone-level audio signal 33 from the basic microphone mixing device 4b or the digital signal processing device 4a. A selection switch 40 is provided for users to select between a line-level or microphone-level audio signal, depending on the desired user input. Fine tuning of the input level is provided on a rotary knob 34 to increase or decrease the input level of mixed microphones as needed.

Audio from the mixed microphones is processed in an audio mixer integrated circuit 31 to provide audio to the Bluetooth integrated circuit 32, which then provides audio utilizing known wireless Bluetooth technology to paired Bluetooth enabled devices 41. According to the present invention, at least one of the paired devices 41 is a mobile telephone. In one embodiment of the present invention, the non-mobile phone paired devices are wireless headsets. During a telephone conference call, the paired mobile phone devices 41 communicate with wireless audio feed processor 21 for sending and receiving audio signals to and from remoter users located at the far end. The paired mobile telephone devices 41 facilitate audio transmission of all local audio feeds with the remote users through Bluetooth integrated circuit 32 of wireless audio feed processor 21. When more than one paired device 41 is a mobile phone, the need for using a phone bridge to connect multiple remote users to the conference call is eliminated.

The Bluetooth integrated circuit 32 sends the received audio signal to mixer integrated circuit 31, which then sends line-level audio to output 35. Fine tuning of the output level is provided on a rotary knob 36 to increase or decrease the output level to the power amplifier as needed. An optional antenna 37 allows the present invention 21 to be installed in a separate location, away from the participants.

The present invention includes two different methods for powering the device 38. One method is to utilize a standard 12V wall adapter plugged into the DC power jack of the device. The second method is to power the device from a 48V "Phantom Power" supplied by microphone mixing device 4b or digital signal processing device 4a. The conferencing apparatus of the present invention can accept both power methods connected simultaneously without damaging the circuitry. Power supplied by either method is properly processed in the power supply integrated circuit 39 and distributed to each integrated circuit in the device.

Figure 5:
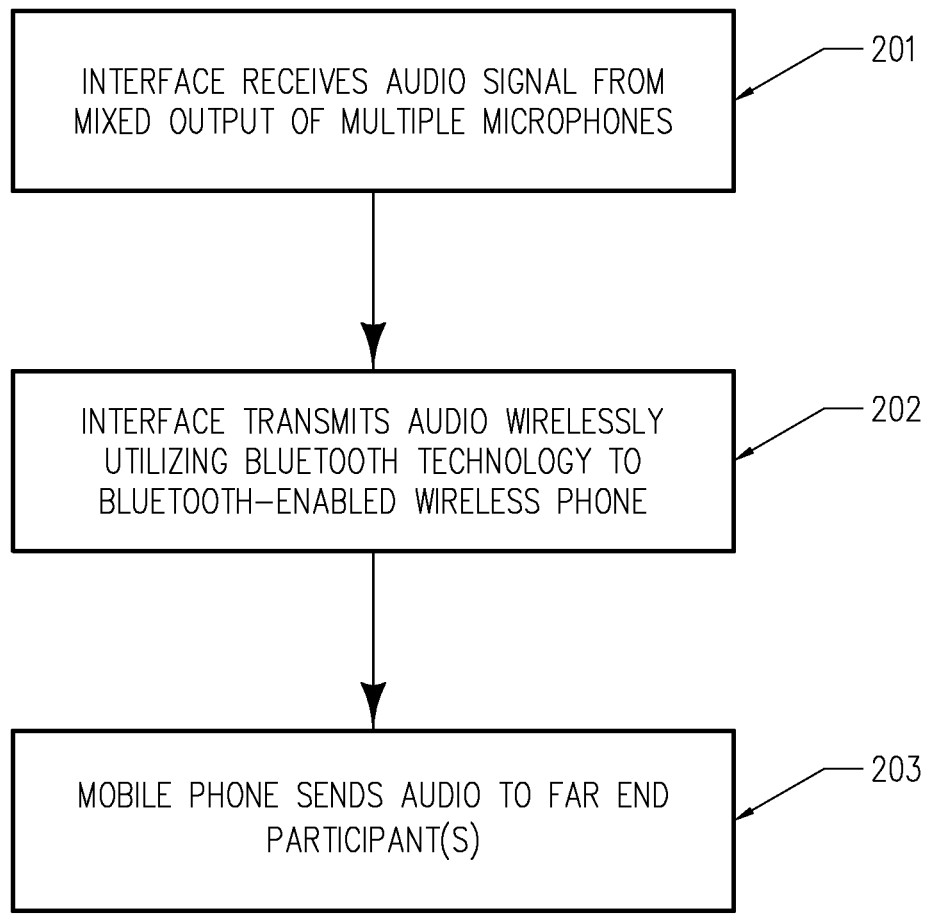
FIG. 5 illustrates how the audio signal is routed according to the present invention.
Figure 6:
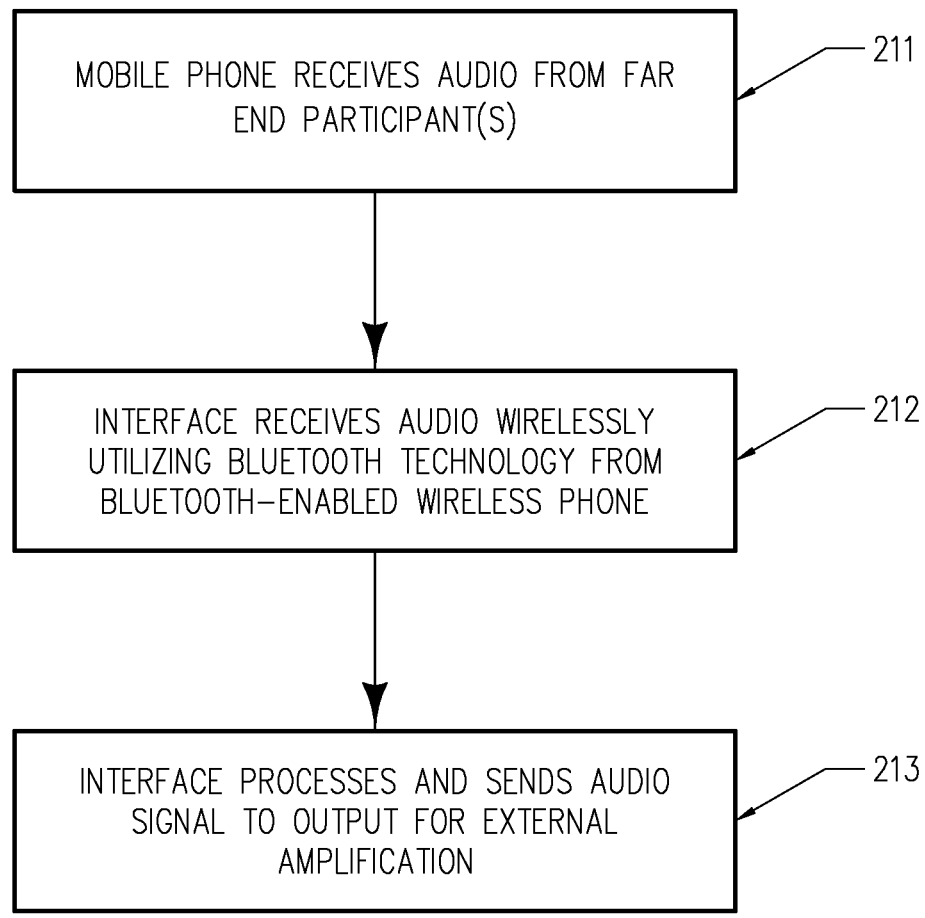
FIG. 6 illustrates how the audio signal is routed according to the present invention.

FIGS. 5 and 6 illustrate flow charts for how audio is routed during an audio conference call over the Bluetooth-enabled mobile phone. According to the present invention, audio is received 201 from the multiple wired and wireless microphones. Audio is then processed 202 and is transmitted wirelessly utilizing Bluetooth technology to the local Bluetooth-enabled mobile phone(s). The paired mobile phone(s) sends 203 the received audio to the far end participant(s). Far end participants transmit the far end audio over the mobile network to the Bluetooth-enabled mobile phone(s) 211, which then transmits the audio wirelessly 212 using Bluetooth technology to the present invention interface. The interface receives and processes the audio 213, and sends this to the output for connection into a power amplified device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A telephone conferencing apparatus comprising:
an external microphone mixer, an audio mixing circuit, a wireless data exchange circuit, a local audio input, and a local audio output,
wherein the external microphone mixer is connectable to at least one local wired microphone;
wherein the local audio input directs audio signals from the external microphone mixer into the audio mixing circuit;
wherein the audio mixing circuit processes received audio signals and communicates with the wireless data exchange circuit to enable the transmission of processed audio signals between the two circuits;
wherein the wireless data exchange circuit receives audio signals from at least one paired mobile phone that may be dialed to a remote user and transmits processed audio signals from the mixing circuit to the paired mobile phone; and
wherein the local audio output directs the processed audio signals to a local external electronic speaker.

2. The telephone conferencing apparatus of claim 1, wherein the wireless data exchange circuit transmits processed audio signals from the mixing circuit to additional paired devices.

3. The telephone conferencing apparatus of claim 2, wherein the additional paired devices comprise wireless headsets.

4. The telephone conferencing apparatus of claim 3, further comprising an antenna operably connected to said wireless data exchange circuit.

5. The telephone conferencing apparatus of claim 2, wherein the additional paired devices comprise mobile phones that may be dialed to additional remote users.

6. The telephone conferencing apparatus of claim 1, further comprising a local audio input tuner.

7. The telephone conferencing apparatus of claim 1, further comprising a local audio output tuner.

8. The telephone conferencing apparatus of claim 1, further comprising a local audio input switch, wherein said switch is selectable between accepting line level or microphone level local audio input.

9. The telephone conferencing apparatus of claim 1, further comprising a power supply circuit.

10. The telephone conferencing apparatus of claim 8, further comprising a power source switch, wherein said switch is selectable between accepting different sources of voltage.

11. The telephone conferencing apparatus of claim 9, wherein said power source circuit is configured to process power from a 48-volt phantom power source.

12. A method of routing processed audio signals from a telephone conference call across a wireless telephone network, said method comprising the steps of:
receiving audio input from an external microphone mixer connected to at least one local microphone;
receiving remote audio input from at least one mobile telephone through a wireless data exchange unit;
processing said local audio input and said remote audio input;
transmitting said processed audio inputs to a local external speaker;

transmitting said processed audio inputs through said wireless data exchange unit to said at least one mobile telephone for routing across a wireless telephone network.

13. The method of claim 12, wherein the local audio input and the remote audio input is processed to suppress acoustic echo.

14. The method of claim 12, wherein the local audio input and the remote audio input is processed to cancel acoustic echo.

15. The method of claim 12, wherein the local audio input is received from a microphone mixer.

16. The method of claim 12, wherein the local audio input is received from a digital signal processor.

17. The method of claim 13, wherein the local audio input is received from a microphone mixer.

18. The method of claim 13, wherein the local audio input is received from a digital signal processor.

19. The method of claim 14, wherein the local audio input is received from a microphone mixer.

20. The method of claim 14, wherein the local audio input is received from a digital signal processor.

* * * * *